United States Patent Office 3,491,123
Patented Jan. 20, 1970

3,491,123
METHOD FOR THE PREPARATION OF β-(5-NITROFURYL-2) ACROLEIN
Karl Karlovich Venter, Ulitsa Krishyana Barona 109, kv. 22; Solomon Aronovich Giller, Ulitsa Pernavas 10, kv. 76; and Via Vilisovna Tsirule, Ulitsa Rendas 4, kv. 1, all of Riga, U.S.S.R.
No Drawing. Filed Nov. 7, 1966, Ser. No. 592,332
Int. Cl. C07d 5/16
U.S. Cl. 260—347.8                     5 Claims

ABSTRACT OF THE DISCLOSURE

Beta-(5-nitrofuryl-2)-acrolein is produced by condensing 5-nitrofurfural with acetaldehyde in the presence of morpholine acetate or diethyl amine acetate. This compound is a starting material for the synthesis of antibacterial pharmaceuticals.

---

This invention relates to a method for the preparation of β-(5-nitrofuryl-2) acrolein from a readily available commercial material, 5-nitrofurfural diacetate, according to the reaction:

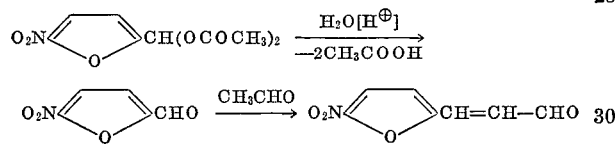

Hydrolysis of the starting compound yields 5-nitrofurfural, which is extracted with benzene and condensed with acetaldehyde in the presence of a catalyst, e.g., morpholine acetate or diethylamine acetate, to give β-(5-nitrofuryl-2) acrolein.

β-(5-nitrofuryl-2) acrolein is a starting material for the synthesis of novel, highly potent, wide-spectrum antibacterial pharmaceuticals, e.g., Furagin (Furaginum) {1-[β-(5-nitrofuryl-2) acrylidenamino]hydantoin}. Clinical investigations have shown Furagin to be much superior (lower toxicity, higher antibacterial activity, and higher tolerance) to similar drugs, such as Nitrofurantoin [1-(5-nitrofurfurylidenamino)hydantoin]. β-(5-nitrofuryl-2) acrolein can likewise be used for the preparation of antibacterial fibre-forming polymers and new anticancer drugs.

A known method of preparting β-(5-nitrofuryl-2)-acrolein comprises condensing vacuum-distilled 5-nitrofurfural with acetaldehyde in the presence of piperidine acetate.

Another known method of preparing β-(5-nitrofuryl-2) acrolein comprises condensing 5-nitrofurfural with vinyl methyl ether in the presence of a catalyst, viz., an ethereal solution of boron trifluoride, followed by acid hydrolysis of the condensation product thus obtained.

Still another known method of synthesizing β-(5-nitrofuryl-2) acrolein involves the nitration of β-(furyl-2) acrolein in acetic anhydride solution in the presence of a catalyst (sulfuric acid).

The disadvantage of the first-named method is that the preparation of vacuum-distilled 5-nitrofurfural from 5-nitrofurfural diacetate involves the highly laborious operations of extracting the product with diethyl ether and subjecting the extract to vacuum distillation. Moreover, the catalyst employed, viz., piperidine acetate, causes marked resinification of β-(5-nitrofuryl-2) acrolein.

The disadvantage of the second method consists in the necessity of employing anhydrous 5-nitrofurfural purified by distillation in vacuum, since the catalysts used, e.g., an ethereal solution of boron trifluoride or anhydrous zinc chloride, lose their catalytic activity in the presence of moisture or other impurities. An additional problem is that the procedure employed, as well as the steps of separating β-(5-nitrofuryl-2) acrolein and recovering the unconverted 5-nitrofurfural present considerable difficulties and feature low reproducibility.

The third method has the disadvantage that the nitration involves consumption of a considerable amount of expensive acetic anhydride.

It is an object of the present invention to provide a method for the synthesis of β-(5-nitrofuryl-2) acrolein from 5-nitrofurfural diacetate under optimum conditions.

It is another object of the present invention to provide a method for the preparation of β-(5-nitrofuryl-2) acrolein whereby the necessity of extracting 5-nitrofurfural with diethyl ether and of subjecting the extract to vacuum distillation are obviated.

A further object of the invention is to provide a method for the preparation of β-(5-nitrofuryl-2) acrolein without employing piperidine acetate as catalyst, inasmuch as said catalyst causes resinification of the product.

A still further object of the invention is to provide a method for the preparation of β-(5-nitrofuryl-2) acrolein wherein the starting materials require no preliminary drying.

It is also an object of the invention to provide a method for the preparation of β-(5-nitrofuryl-2) acrolein wherein use is made of catalysts which retain their activity in the presence of moisture.

It is an additional object of the invention to provide a method for the preparation of β-(5-nitrofuryl-2) acrolein whereby the necessity of employing significant amounts of expensive acetic anhydride is obviated.

Finally, it is an object of the present invention to provide a method for the preparation of β-(5-nitrofuryl-2) acrolein whereby the final product is obtained at a reduced cost price.

The specific object of the present invention is to provide a method for the preparation of β-(5-nitrofuryl-2) acrolein from 5-nitrofurfural diacetate wherein the condensation reaction between 5-nitrofurfural and acetaldehyde is carried out under optimum conditions and in the presence of the most suitable catalysts.

According to the present invention this object is accomplished by a method which comprises subjecting 5-nitrofurfural diacetate to hydrolysis with 20–25% sulfuric acid at a temperature of 90–95% C., with vigorous stirring, for a period of 10–20 minutes, followed by extracting the 5-nitrofurfural thus obtained with an organic solvent, preferably benzene.

The benzene solution of 5-nitrofurfural is washed with water or a saturated aqueous solution of mineral salts that exhibit no chemical activity under the reaction conditions, and next said benzene solution is condensed with acetaldehyde, with heating, in the presence of a catalyst, viz., an organic salt of a secondary amine, preferably morpholine or diethylamine acetate. Distilling out the solvent results in sufficiently pure crystalline β-(5-nitrofuryl-2) acrolein, to permit its use in subsequent syntheses.

The present method for the synthesis of β-(5-nitrofuryl-2) acrolein makes it possible to manufacture said compound from readily available and comparatively cheap starting materials, viz., from 5-nitrofurfural diacetate and acetaldehyde. The procedure employed is simple and readily lends itself to commercial use. The catalysts used in the condensation reaction, viz., morpholine acetate or diethylamine acetate make for increased yields of β-(5-nitrofuryl-2) acrolein and higher quality of said product, since said catalysts are instrumental in substantially reducing the formation of resinous by-products.

The following example embodying the method of the present invention is presented by way of illustration.

EXAMPLE

A mixture comprising 450 ml. of water, 184 g. of sulfuric acid (Sp. Gr., 1.84), and 243 g. of 5-nitrofurfural diacetate is heated at 90–95° C., with vigorous stirring, for a period of 15–20 minutes, and is then cooled to 35–40° C.; the 5-nitrofurfural thus obtained is extracted with 500 ml. of benzene; the benzene extract is washed with a sodium chloride solution until the washings, are neutral, and cooled to 5° C. Next, 66 g. of acetaldehyde and 1.6 g. of acetic acid are added to the extract and thereafter a solution of 1.8 g. of morpholine in 20 ml. of benzene is introduced dropwise over a period of 1 hour (an equimolar amount of diethylamine may be used instead of the morpholine). The mixture is refluxed, with constant stirring, on a water bath, first for two hours at 40–45° C. and then for 6 hours at the boiling point. The benzene solution is decanted and the residue in the flask is washed with 150 ml. of hot benzene. The benzene solutions are combined, treated at 50–60° C. with 6 g. of active charcoal, and filtered. Next the solvent is distilled off and the oily residue obtained is left for a period of 12 hours in a refrigerator. The product which crystallizes therefrom is filtered off, washed with 60 ml. of cold benzene and 30 ml. of isopropanol, and dried at 30–40° C.

The yield of β-(5-nitrofuryl-2) acrolein (M.P. 110–116° C.) is 50–57 g. (30–32% of theory based on the initial 5-nitrofurfural diacetate used).

What we claim is:

1. A method for the preparation of β-(5-nitrofuryl-2) acrolein from 5-nitrofurfural diacetate, said method comprising hydrolyzing 5-nitrofurfural diacetate with stirring, in the presence of a mineral acid to form 5-nitrofurfural and condensing the 5-nitrofurfural in an organic solvent with acetaldehyde in the presence of a catalyst selected from the group consisting of the acetates of morpholine and diethylamine.

2. A method according to claim 1, wherein hydrolysis is effected at a temperature of 90–95° C. for 10–20 minutes.

3. A method according to claim 1 wherein the organic solvent is benzene.

4. A method for the preparation of β-(5-nitrofuryl-2) acrolein which comprises condensing 5-nitrofurfural with acetaldehyde in an organic solvent in the presence of morpholine acetate or diethylamine acetate.

5. In a method for the preparation of β-(5-nitrofuryl-2) acrolein which comprises condensing 5-nitrofurfural with acetaldehyde in an organic solvent in the presence of an organic salt of a secondary amine, an improvement comprising utilizing morpholine acetate or diethylamine acetate as the organic salt of a secondary amine.

References Cited

Hillers et al., Chem. Abstracts, vol. 53, p. 17090i (1959).

Cram and Hammond, Organic Chemistry, New York, McGraw-Hill (1959), pp. 272–3 and 284–5.

ALEX MAZEL, Primary Examiner

B. I. DENTZ, Assistant Examiner